United States Patent
Nakamura et al.

(10) Patent No.: US 7,897,656 B2
(45) Date of Patent: Mar. 1, 2011

(54) OIL-BASED WHITE INK FOR INK JET RECORDING

(75) Inventors: Masahiro Nakamura, Nagano (JP); Seiji Mochizuki, Nagano (JP); Makoto Otsuki, Nagano (JP); Yukio Sugita, Kanagawa (JP); Shinichi Yoshimitsu, Kanagawa (JP)

(73) Assignees: Seiko Epson Corporation, Tokyo (JP); The Inctec Inc., Yokohama-Shi (JP)

( * ) Notice: Subject to any disclaimer, the term of this patent is extended or adjusted under 35 U.S.C. 154(b) by 719 days.

(21) Appl. No.: 11/659,588

(22) PCT Filed: Aug. 12, 2005

(86) PCT No.: PCT/JP2005/014836
§ 371 (c)(1),
(2), (4) Date: Nov. 14, 2007

(87) PCT Pub. No.: WO2006/016674
PCT Pub. Date: Feb. 16, 2006

(65) Prior Publication Data
US 2008/0194754 A1    Aug. 14, 2008

(30) Foreign Application Priority Data
Aug. 12, 2004  (JP) ................ P.2004-235273

(51) Int. Cl.
*C09D 11/00* (2006.01)

(52) U.S. Cl. .............. 523/160; 523/161; 524/497; 347/100; 106/31.9; 106/31.65; 106/31.89

(58) Field of Classification Search ............ 524/497; 347/100; 106/31.9, 31.65, 31.89; 523/160, 523/161
See application file for complete search history.

(56) References Cited

U.S. PATENT DOCUMENTS

| | | | |
|---|---|---|---|
| 2003/0199608 A1* | 10/2003 | Kamigaki et al. | 523/160 |
| 2004/0068031 A1 | 4/2004 | Horie et al. | |
| 2004/0080574 A1* | 4/2004 | Masumi | 347/47 |
| 2005/0020728 A1* | 1/2005 | Nagaswa et al. | 523/160 |
| 2005/0192380 A1* | 9/2005 | Horie et al. | 523/160 |

FOREIGN PATENT DOCUMENTS

| | | |
|---|---|---|
| EP | 1 114 850 | 7/2001 |
| JP | 60-118767 A | 6/1985 |
| JP | 4-187229 A | 7/1992 |
| JP | 5-237360 A | 9/1993 |
| JP | 5-287214 A | 11/1993 |
| JP | 9-176512 A | 7/1997 |
| KR | 97-010596 | 12/1995 |

OTHER PUBLICATIONS

English abstract of KR 97010596 dated Dec. 22, 1995.

* cited by examiner

*Primary Examiner*—David Wu
*Assistant Examiner*—Vu A Nguyen
(74) *Attorney, Agent, or Firm*—Ladas & Parry LLP

(57) ABSTRACT

The present invention relates to an ink jet ink which is an oil-based white ink for ink jet recording containing (a) titanium oxide having an average particle size of 0.15 to 0.25 μm, (b) a resin, (c) an organic solvent and (d) a nonionic surfactant, wherein the nonionic surfactant comprises at least one member selected from polyoxyethylene alkyl ethers and polyoxyethylene phenyl ethers. According to the invention, there can be provided an oil-based white ink for ink jet recording which is excellent in ejection stability and in recovery properties after standing for a long period of time.

12 Claims, No Drawings ent (a) which characterizes the invention is fine titanium
OIL-BASED WHITE INK FOR INK JET RECORDING

TECHNICAL FIELD

The present invention relates to an oil-based white ink for ink jet recording (hereinafter occasionally simply referred to as a "white ink" or "ink"), and particularly relate to an oil-based white ink for ink jet recording which is stable in ejection properties and excellent in recovery properties after standing for a long period of time.

BACKGROUND ART

Conventionally, an ink jet recording system is a recording system in which ink liquid droplets are ejected from a print head or a spray nozzle toward a material to be recorded, at high speed according to electronic signals from a computer or the like to perform printing on an ink receiving layer of the material to be recorded. In the above-mentioned ink jet recording system, the noise is small, and recording is possible at high speed, so that the system has widely prevailed in copies, facsimiles, posters, displays and the like. Based on this, it is required that an ink used in this ink jet recording system has no variation with time, and can maintain sufficient density for a long period of time when an image has been formed, and that the image printed on the material to be recorded has excellent original reproducibility and sufficient density.

For this reason, it is required that the ink used does not clog in the nozzle of a head, and does not clog a filter through which it passes in the course from an ink cartridge to the head. For the ink, therefore, it is necessary to adjust ink characteristics such as density, viscosity, particle size and concentration. The above-mentioned ink is generally constituted by a coloring agent such as a dye or a pigment, a dispersant or solvent for dispersing these, and an additive as needed.

In particular, a white ink for ink jet is printed on a low-brightness black-based or transparent material to be recorded, thereby obtaining printed matter having good visibility. It is therefore effective for marking of various products. Further, when the above-mentioned material to be recorded is printed with a colored ink other than the white ink, clear printing cannot be reproduced under the influence of a base color. For this reason, it is required that base printing is performed with a white ink having sufficient hiding properties to a ground to hide the blank ground, followed by printing on the white ground with the other colored ink.

However, in the above-mentioned white ink, a titanium oxide pigment is used as the coloring agent, and in the white ink in which a conventional titanium oxide pigment is used, redispersibility of the titanium oxide pigment becomes deteriorated due to the specific gravity of pigment particles, a solvent used and the like during storage, particularly, when an alcoholic solvent is used, by sedimentation and coagulation of the titanium oxide pigment with time. In order to solve such a problem, a white pigment composition (patent document 1) is proposed. However, in the white pigment composition disclosed in patent document 1, the redispersibility of a white pigment precipitated is improved by dispersing a titanium oxide pigment only treated with aluminum, in an alcoholic solvent using a carboxylic group-containing acrylic resin as a dispersant. In an actual operation, however, it has been desired that the composition can be used as such without performing redispersion of the pigment sedimented in the ink. Further, when the titanium oxide pigment is used as the white pigment, coagulation and sedimentation of the pigment in the ink are liable to proceed in storage of the ink. In particular, when it is used in an ink jet ink, the long period during which a printer is not used conceivably causes the case of unstable ejection or the case of clogging a nozzle of the printer, resulting in the necessity of replacing a head of the printer in the worst case.

Patent Document 1: JP-A-6-107964

DISCLOSURE OF THE INVENTION

Problems that the Invention is to Solve

It is therefore an object of the invention to provide an oil-based white ink for ink jet recording excellent, particularly in ejection stability and recovery properties after standing for a long period of time.

Means for Solving the Problems

The above-mentioned object is achieved by the following invention. That is to say, the invention relates to an ink jet ink which is an oil-based white ink for ink jet recording containing (a) titanium oxide having an average particle size of 0.15 to 0.25 µm, (b) a resin, (c) an organic solvent and (d) a nonionic surfactant, wherein the above-mentioned nonionic surfactant comprises at least one member selected from polyoxyethylene alkyl ethers and polyoxyethylene phenyl ethers, which are polyoxyethylene derivatives.

The present inventors have found that the above-mentioned oil-based white ink for ink jet recording stabilizes ejection, and is an ink excellent in recovery properties even when it is allowed to stand for a long period of time, thus resulting in the invention.

ADVANTAGE OF THE INVENTION

According to the invention, by dispersing a specific white pigment into a specific dispersant and solvent and by adding thereto a specific surfactant, there can be provided an ink which is excellent in sedimentation resistance with time, good in ejection stability, and further extremely good in recovery properties even when solidification of an ink proceeds in a nozzle due to evaporation of a solvent and the like after standing for a long period of time.

BEST MODE FOR CARRYING OUT THE INVENTION

With reference to the best mode for carrying out the invention, the invention will be described in detail below. Component (a) which characterizes the invention is fine titanium oxide particles having an average particle size of 0.15 to 0.25 µm. The fine titanium oxide particles used in the invention are preferably coated with an oxide of aluminum and/or silicon, and coated titanium oxide is preferably a white pigment which is further surface-treated with a SiH-containing polysiloxane and/or dimethyl polysiloxane at a ratio of 0.01 to 2.5% by mass. The term "oxide" used in the invention means an anhydrous oxide, a hydrous oxide or a mixture of both.

As the above-mentioned titanium oxide, there can be used known rutile type and/or anatase type titanium dioxide, and preferably, rutile type titanium dioxide is used. Further, the above-mentioned oxides (and hydrous oxides thereof) include, for example, oxides such as $SiO_2$ and $Al_2O_3$, and hydrous oxides such as $SiO_2 \cdot nH_2O$ and $Al_2O_3 \cdot nH_2O$, and preferably, $Al_2O_3$ and the hydrous oxide thereof are used. The above-mentioned component (a) is fine particles having an average particle size of 0.15 to 0.25 μm, preferably 0.15 to 0.21 μm, in a state in which the particles are surface-treated with the above-mentioned oxide or hydrous oxide thereof. Although the mass ratio of the fine titanium oxide particles to the above-mentioned oxide in this case is not particularly limited, the above-mentioned oxide is generally about 0.01 to 30 parts by mass per 100 parts by mass of the fine titanium oxide particles.

When the average particle size of the above-mentioned component (a) exceeds the above-mentioned upper limit, the pigment is liable to coagulate and sediment during storage, resulting in deterioration of storage stability, although the hiding properties of the resulting ink to a ground increases. Further, the ink becomes liable to clog in a print head during printing. On the other hand, when the average particle size of the above-mentioned component (a) is less than the above-mentioned lower limit, the hiding properties to a ground of the printed matter are insufficient, although the pigment does not sediment during storage to give good storage stability.

The above-mentioned SiH-containing polysiloxanes include, for example, SiH group-containing polysiloxanes such as one containing as a main component a methylhydrogenpolysiloxane represented by the following general formula (1), a methylhydrogencyclopolysiloxane and a derivative thereof. Above all, a methylhydrogenpolysiloxane represented by the following general formula (1) is preferred.

In the following formula, m is an integer of 0 or more, n is an integer of 1 or more, and m+n is an integer of 3 to 500. More preferred examples of the methylhydrogenpolysiloxanes include one in which m+n is 10 to 100 in the following formula. When the value of the above-mentioned m+n is too high or too low, the dispersibility of the pigment is lowered. The above-mentioned methylhydrogenpolysiloxane is available from Shin-Etsu Chemical Co., Ltd. under the trade name of Methylhydrogenpolysiloxane "KF-99", and can be used in the invention.

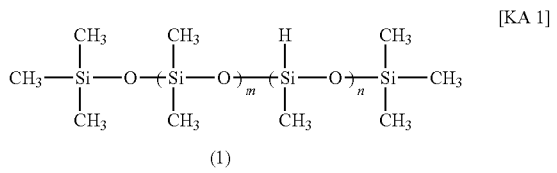

(1)

[KA 1]

Further, the above-mentioned dimethylpolysiloxanes include, for example, one containing as a main component a straight chain type dimethylpolysiloxane represented by the following general formula (2) (n represents an integer of 1 or more).

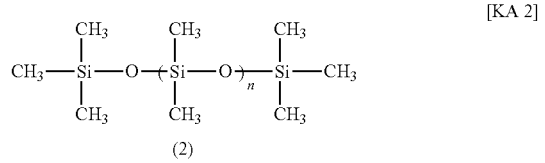

(2)

[KA 2]

The above-mentioned dimethylpolysiloxane is available from Shin-Etsu Chemical Co., Ltd. under the trade name of Dimethylpolysiloxane "KF-96", and can be used in the invention.

Further, component (a) used in the invention can be treated by using a silicone oil such as a methylphenylsilicone oil, a polyether-modified silicone oil, an alkyl-modified silicone oil, an amino-modified silicone oil, a mercapto-modified silicone oil or a fluorine-modified silicone oil in combination with the above-mentioned polysiloxane.

In a preferred embodiment of component (a) used in the invention, titanium oxide treated with the above-mentioned oxide of aluminum and/or silicon is further coated with the above-mentioned polysiloxane. The amount of the above-mentioned polysiloxane coated on the pigment is from 0.01 to 2.5% by mass, and preferably from 0.3 to 1.0% by mass. When the amount of the above-mentioned polysiloxane coated exceeds the above-mentioned upper limit, component (a) comes to be easily sedimented in the resulting ink. On the other hand, when the amount of the polysiloxane coated is less than the above-mentioned lower limit, the whiteness having sufficient density is not obtained in the resulting ink, resulting in insufficient hiding properties to the ground of the printed matter.

Further, component (b) used in the invention is a resin, which is a polymeric dispersant or a fixing resin. Preferred examples of the above-mentioned polymeric dispersants include known polymeric dispersants, for example, proteins such as gelatin, casein and albumin; natural gums such as arabic gum and tragacanth gum; alginic acid derivatives such as triethanolamine alginate and ammonium alginate; polyvinyl alchohols; polyvinylpyrrolidones; ammonium or amine salts of polyacrylic acid, acrylic copolymers such as an acrylic acid-acrylonitrile copolymer, a vinyl acetate-acrylic ester copolymer and an acrylic acid-alkyl acrylate copolymer, styrene-acrylic copolymers such as a styrene-methacrylic acid copolymer and a styrene-methacrylic acid-alkyl acrylate copolymer, styrene-maleic acid copolymers, vinyl acetate-based copolymers such as a vinyl acetate-ethylene copolymer, a vinyl acetate-maleic ester copolymer and a vinyl acetate-crotonic acid copolymer, and the like.

The above-mentioned salts include an amine salt of a polymer and a copolymer comprising a monomer such as an amine salt-containing acrylic ester such as a tertiary amino group-containing monomer, as a monomer constituting at least a part of the resulting polymer, for example, using dimethylaminoethyl (meth)acrylate, diethylaminoethyl (meth)acrylate, dimethylaminopropyl(meth)acrylamide or diethylaminopropyl(meth)acrylamide.

Preferred examples of the polymeric dispersants include an amine salt of an acrylic copolymer having a weight average molecular weight of 40,000 to 60,000, and particularly preferred example thereof include a tertiary amine salt. The above-mentioned polymeric dispersant is available from BYK-Chemie Co. under the trade name of "Disperbyk (registered trade mark) 2050" or the like, and can be used in the invention.

The above-mentioned fixing resin is preferably a (meth)acrylic resin, that is to say, an acrylic resin or a methacrylic resin. In a more preferred embodiment, it is a homopolymer of methyl methacrylate alone or a copolymer of methyl methacrylate and butyl methacrylate.

Further, component (c) used in the invention includes an organic solvent having good wettability with component (a) and containing as a main component a glycol ether which is effective for printability of the resulting ink.

The above-mentioned glycol ethers include, for example, monobutyl ether of di- or tri-ethylene glycol, monobutyl ether; monoethyl ether, monopropyl ether or monomethyl ether of propylene glycol; ethers such as monobutyl ether of dipropylene glycol and monohexyl ether of diethylene glycol; a mixture thereof; and the like, and preferably include at least one member selected from diethylene glycol diethyl ether, dipropylene glycol monomethyl ether and triethylene glycol monomethyl ether.

Another organic solvent, for example, an ester such as ethylene glycol monomethyl ether acetate, ethylene glycol monoethyl ether acetate, diethylene glycol monomethyl ether acetate or propylene glycol monomethyl ether acetate, a lactone solvent or the like can be used in combination with the above-mentioned component (c), as needed. The lactone solvent is a compound having a cyclic structure by an ester bond, and includes a γ-lactone of a 5-membered ring structure, a δ-lactone of a 6-membered ring structure, an ε-lactone of a 7-membered ring structure and the like. For example, there can be used γ-butyrolactone, γ-valerolactone, γ-hexylactone, γ-heptalactone, δ-octalactone, δ-nonalactone, δ-decalactone, δ-undecalactone, ε-caprolactone and a mixture thereof.

Component (d) used in the invention is a nonionic surfactant, and comprises at least one member selected from polyoxyethylene alkyl ethers and polyoxyethylene phenyl ethers, which are polyoxyethylene derivatives. Above all, a polyoxyethylene alkyl ether, a polyoxyethylene alkyl phenol ether and a mixture of a polyoxyethylene alkyl ether and a polyoxyalkylene mono(or di)fatty acid ester are preferred, and it is more preferred that they are in liquid form at ordinary temperature, 20±5° C., under atmospheric pressure.

The amount of the nonionic surfactant added is preferably from 20% by mass to 100% by mass based on component (a). When the amount added is lower than the above-mentioned range, redissolution properties in the case of being solidified significantly decreases.

On the other hand, when the amount added is more than the above-mentioned range, drying properties at the time when printed decrease, and coating strength decreases.

Further, from miscibility with an ink system and redissolution properties in the case of being solidified, the HLB (hydrophile-lipophile balance) value of the nonionic surfactant is preferably from 10 to 13.

As the preferred surfactants, polyoxyethylene alkyl-phenol ethers are available to use, for example, under the trade names of HS-206 and HS-208 manufactured by NOF Corporation, and the like, and polyoxyethylene alkyl ethers are available to use, for example, under the trade names of Noigen LP-70 and Noigen LP-100 manufactured by Dai-Ichi Kogyo Seiyaku Co., Ltd., Naroacty HN70 and Naroacty HN85 manufactured by Sanyo Chemical Industries, Ltd., Pegnol O-6A manufactured by Toho Chemical Industry Co., Ltd., Emalgen LS-106 and Emalgen LS-114 manufactured by Kao Corporation, NIKKOL BT-5 and NIKKOL BT-7 manufactured by Nikko Chemicals Co., Ltd., and the like. Further, the mixtures of a polyoxyethylene alkyl ether and a polyoxyethylene monofatty acid ester are available to use under the trade names of Flowlen D-90 manufactured by Kyoeisha Chemical Co., Ltd., and the like.

The ink of the invention can contain, as needed, a resin which can be mixed and dispersed in the above-mentioned solvent mainly containing the glycol ether and/or the glycol, for example, a vinyl chloride-vinyl acetate copolymer, a rosin-modified phenol resin, a polyester resin, a polyamide resin or an epoxy resin. Further, to the ink of the invention, known additives such as a wax, an antioxidant, a surfactant, a viscosity modifier, a plasticizer, an antifoaming agent, an antioxidant and an ultraviolet absorber can be added to use within the range in which the object of the invention is not hindered.

The ink of the invention is prepared by homogeneously mixing the above-mentioned respective components by a known method to disperse the above-mentioned component (a) in a solvent. Preparation methods include, for example, a method of performing dispersion with zirconia beads having a diameter of 0.8 mm in a paint shaker for 1 hour, and then, performing dispersion with zirconia beads having a diameter of 0.3 mm for 5 hours to adjust the viscosity of the ink to 4.0 to 4.5 mPa·s. Viscosity measurement of the ink is a value measured with a falling-ball type viscometer (AMVn manufactured by Nihon Siber Hegner KK). Printing to a usual material to be recorded with the above-mentioned ink can be performed by using a commercially available ink jet printer.

EXAMPLES

The present invention will be illustrated in greater detail with reference to the following examples and comparative examples, but the invention should not be construed as being limited to the following examples. The "parts" and "%" are given on mass basis, unless otherwise specified.

Example 1

The following component (a), component (b), component (c) and component (d) were homogeneously mixed and dispersed by the above-mentioned preparation method to prepare ink V1 of the invention having a viscosity of 4.0 to 4.5 mPa·s. Component (a), component (b), component (c) and component (d) are as follows:

Component (a): A white pigment in which titanium dioxide surface-treated with alumina and having an average particle size of 0.21 μm is further 0.75% treated with a methylhydrogenpolysiloxane (Methylhydrogenpolysiloxane KF-99 manufactured by Shin-Etsu Chemical Co., Ltd., 6.0 parts Component (b): An acrylic polymeric dispersant (manufactured by BYK-Chemie Co., Disperbyk-2050, weight average molecular weight 50,000), 1.4 parts, and an acrylic resin (manufactured by Rohm & Haas Company, Paraloid E60), 2.0 parts Component (c): A mixed solvent of 62.6 parts of diethylene glycol diethyl ether, 15.0 parts of γ-valerolactone and 10.0 parts of tetraethylene glycol monobutyl ether Component (d): Noigen LP-70 (manufactured by Dai-Ichi Kogyo Seiyaku Co., Ltd., HLB 10.5), 3.0 parts Example 2

Ink V2 of the example was prepared in the same manner as in Example 1 with the exception that 3.0 parts of Naroacty HN70 (manufactured by Sanyo Chemical Industries, Ltd., HLB 11.7) was used in place of Noigen LP-70 used in Example 1.

Example 3

Ink V3 of the example was prepared in the same manner as in Example 1 with the exception that 3.0 parts of Naroacty HN85 (manufactured by Sanyo Chemical Industries, Ltd., HLB 12.6) was used in place of Noigen LP-70 used in Example 1, and that γ-valerolactone was changed to γ-butyrolactone.

Example 4

Ink V4 of the example was prepared in the same manner as in Example 1 with the exception that 3.0 parts of Flowlen D-90 (manufactured by Kyoeisha Chemical Co., Ltd., HLB 12.6) was used in place of Noigen LP-70 used in Example 1.

Example 5

Ink V5 of the example was prepared in the same manner as in Example 1 with the exception that 3.0 parts of a polyoxyethylene alkyl ether, Pegnol O-6A (manufactured by Toho Chemical Industry Co., Ltd., HLB 9.6), was used in place of Noigen LP-70 used in Example 1.

Example 6

Ink V6 of the example was prepared in the same manner as in Example 1 with the exception that 3.0 parts of a polyoxyethylene alkyl ether, Emalgen LS-114 manufactured by Kao Corporation, HLB 14.0), was used in place of Noigen LP-70 used in Example 1.

Comparative Example 1

Ink Y1 of the comparative example was prepared in the same manner as in Example 1 with the exception that Noigen LP-70 used in Example 1 was not added.

Comparative Example 2

Ink Y2 of the comparative example was prepared in the same manner as in Example 1 with the exception that 3.0 parts of NIKKOL DECAGLYN 1-IS (manufactured by Nikko Chemicals Co., Ltd., HLB 12.0) of a polyglycerin fatty acid ester was used in place of Noigen LP-70 used in Example 1.

Comparative Example 3

Ink Y3 of the comparative example was prepared in the same manner as in Example 1 with the exception that 3.0 parts of NIKKOL TO-30 (manufactured by Nikko Chemicals Co., Ltd., HLB 11.0) of a polyoxyethylene sorbitan fatty acid ester was used in place of Noigen LP-70 used in Example 1.

Comparative Example 4

Ink Y4 of the comparative example was prepared in the same manner as in Example 1 with the exception that 3.0 parts of NIKKOL MYO-10 (manufactured by Nikko Chemicals Co., Ltd., HLB 11.0) of a polyethylene glycol fatty acid ester was used in place of Noigen LP-70 used in Example 1.

Using the respective inks obtained in the above-mentioned Examples and Comparative Examples, a redissolution test and evaluation of nozzle recovery properties and ejection with MJ-8000C (manufactured by EPSON) were performed.

(Redissolution Test)

One gram of an ink was taken in a petri dish, and allowed to stand at 40° C. for 3 days. The ink was dropped again onto the dried and solidified ink to confirm redissolution (dispersing) properties.

Evaluation:
A: Redissolved.
B: Partially redissolved.
C: Not redissolved.

(Intermittent Ejection)

An ink was filled, and continuous printing was performed for 1 hour. Thereafter, it was allowed to stand for 1 hour, and printing was performed again. Then, the presence or absence of deflected ejection and dot missing was confirmed, and recovery properties by a cleaning operation were evaluated.

Evaluation:
A: There is no deflection or no dot missing.
B: There is deflection or dot missing, but it recovers by several or more times of cleaning.
C: There is deflection or dot missing, and it does not recover even by cleaning.

(Long-Term Standing 1)

An ink was filled, and continuous printing was performed for 1 day. Thereafter, it was allowed to stand at 35° C. for 2 weeks, and printing was performed again. Then, the presence or absence of deflected ejection and dot missing was confirmed, and recovery properties by a cleaning operation were evaluated.

Evaluation:
A: There is deflection or dot missing, but it recovers by one or two times of cleaning.
B: There is deflection or dot missing, but it recovers by three or more times of cleaning.
C: There is deflection or dot missing, and it does not recover even by cleaning.

(Long-Term Standing 2)

An ink was filled, and continuous printing was performed for 1 day. Thereafter, it was allowed to stand at 5° C. to 25° C. for 1 month, and printing was performed again. Then, the presence or absence of deflected ejection and dot missing was confirmed, and recovery properties by a cleaning operation were evaluated.

Evaluation:
A: There is deflection or dot missing, but it recovers by one or two times of cleaning.
B: There is deflection or dot missing, but it recovers by three or more times of cleaning.
C: There is deflection or dot missing, and it does not recover even by cleaning.

TABLE 1

|  | V1 | V2 | V3 | V4 | V5 | V6 | Y1 | Y2 | Y3 | Y4 |
|---|---|---|---|---|---|---|---|---|---|---|
| Redissoltion Properties | A | A | A | A | B | B | C | C | C | C |
| Intermittent Ejection | A | A | A | A | A | A | B | B | B | B |
| Long-Term Standing 1 | A | A | A | A | B | A | C | C | C | C |
| Long-Term Standing 2 | A | A | A | A | B | B | C | C | C | C |

From the above-mentioned evaluation results, as for the inks of the invention, deflection or clogging is difficult to occur, even when they are allowed to stand for a long period of time under the above-mentioned conditions. Further, even when it has occurred, it can be quickly recovered.

While the present invention has been described in detail and with reference to specific embodiments thereof, it will be apparent to one skilled in the art that various changes and modifications can be made therein without departing from the spirit and scope thereof.

This application is based on Japanese Patent Application No. 2004-235273 filed on Aug. 12, 2004, the contents thereof being herein incorporated by reference.

INDUSTRIAL APPLICABILITY

According to the invention, the ink of the invention does not bring about clogging in a print head, and makes it possible to perform continuous printing having no print trouble. When a printer is not used for a long period of time, deflection or clogging is difficult to occur, and it can be easily recovered, even when such a symptom has occurred.

Consequently, it can be efficiently used as an extremely excellent oil-based white ink for ink jet recording which can largely decrease the load of maintenance.

The invention claimed is:

1. An ink jet ink which is an oil-based white ink for ink jet recording containing (a) titanium oxide having an average particle size of 0.15 to 0.25 μm, (b) a resin, (c) an organic solvent and (d) a nonionic surfactant, wherein the nonionic surfactant comprises at least one member selected from the group consisting of polyoxyethylene alkyl ethers and polyoxyethylene phenyl ethers, and wherein the content of the nonionic surfactant is from 20% by mass to 100% by mass based on the titanium oxide.

2. An ink jet ink which is an oil-based white ink for ink jet recording containing (a) titanium oxide having an average particle size of 0.15 to 0.25 μm, (b) a resin, (c) an organic solvent and (d) a nonionic surfactant, wherein the nonionic surfactant comprises at least one member selected from the group consisting of polyoxyethylene alkyl ethers and polyoxyethylene phenyl ethers, and wherein the nonionic surfactant has an HLB value of from 10 to 13.

3. An ink jet ink which is an oil-based white ink for ink jet recording containing (a) titanium oxide having an average particle size of 0.15 to 0.25 μm, (b) a resin, (c) an organic solvent and (d) a nonionic surfactant, wherein the nonionic surfactant comprises at least one member selected from the group consisting of polyoxyethylene alkyl ethers and polyoxyethylene phenyl ethers, and wherein the titanium oxide is coated with an oxide of aluminum and/or silicon.

4. The ink jet ink according to claim 3, wherein the titanium oxide is further surface-treated with a SiH-containing polysiloxane and/or dimethyl polysiloxane at a ratio of 0.01 to 2.5% by mass.

5. An ink jet ink which is an oil-based white ink for ink jet recording containing (a) titanium oxide having an average particle size of 0.15 to 0.25 μm, (b) a resin, (c) an organic solvent and (d) a nonionic surfactant, wherein the nonionic surfactant comprises at least one member selected from the group consisting of polyoxyethylene alkyl ethers and polyoxyethylene phenyl ethers, and wherein the organic solvent (c) comprises a mixed solvent of diethylene glycol diethyl ether and a lactone.

6. The ink jet ink according to claim 1, wherein the nonionic surfactant has an HLB value of from 10 to 13.

7. The ink jet ink according to claim 1, wherein the titanium oxide is coated with an oxide of aluminum and/or silicon.

8. The ink jet ink according to claim 2, wherein the titanium oxide is coated with an oxide of aluminum and/or silicon.

9. The ink jet ink according to claim 1, wherein the organic solvent (c) comprises a mixed solvent of diethylene glycol diethyl ether and a lactone.

10. The ink jet ink according to claim 2, wherein the organic solvent (c) comprises a mixed solvent of diethylene glycol diethyl ether and a lactone.

11. The ink jet ink according to claim 3, wherein the organic solvent (c) comprises a mixed solvent of diethylene glycol diethyl ether and a lactone.

12. The ink jet ink according to claim 4, wherein the organic solvent (c) comprises a mixed solvent of diethylene glycol diethyl ether and a lactone.

* * * * *